Patented Feb. 19, 1935

1,991,790

UNITED STATES PATENT OFFICE 1,991,790

PROCESS FOR SEPARATING MONO- AND DI-ALKYL AMINES OF THE BENZENE SERIES

John Belmont Cook, Jr., and Donald Hutton, Wilmington, Del., assignors to E. I. du Pont de Nemours & Company, Wilmington, Del., a corporation of Delaware No Drawing. Application October 29, 1930, Serial No. 492,083

9 Claims. (Cl. 260—128)

This invention relates to the isolation of organic compounds and more particularly to the separation of di-alkyl-aromatic amines and mono-alkyl-aromatic-amines.

Piutti (Liebigs Annalen, Vol. 227, page 181) essayed the separation of tertiary amines from mixtures containing tertiary amines and secondary amines by reacting at elevated temperatures the secondary amines with phthalic anhydride. In the case of the mixture containing di-ethyl aniline and mono-ethyl aniline (a typical mixture) the selective reaction which should have taken place is represented by the following equation:

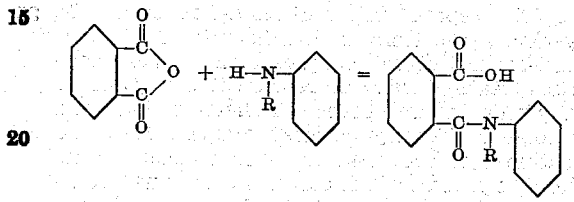

in which R represents in general an alkyl group and in this instance the ethyl group.

In general Piutti's process consisted in repeatedly fractionating the mixture in order to separate the di-ethyl aniline and the mono ethyl aniline by physical means. Thereafter he repeatedly treated each of the fractions with phthalic anhydride under refluxing conditions and at elevated temperatures. As will be obvious his method was long and expensive. It was entirely unsuited for commercial application as noted by Flemming & Klein who state (U. S. Patent 1,695,372 of Dec. 18, 1928, lines 6 to 14).

"Piutti has attempted to purify diethylaniline by means of phthalic anhydride but although he employs a diethylaniline which has already been purified to a considerable extent by distillation, his process is very lengthy and owing to the necessity of repeatedly distilling the high-boiling diethylaniline, is too expensive."

It is an object of this invention to devise a satisfactory process for the separation of di-alkyl aromatic amines from mono-alkyl aromatic amines. Other objects are the production of di-alkyl aromatic amines in a purer state, the preparation of mono-alkyl aromatic secondary amines in a purer state and in general an advance in the art. Other objects will appear hereinafter.

These objects are accomplished by the present invention whereby it has been found that mixtures of aromatic amines may be separated by treatment with phthalic anhydride and that it is unnecessary to use high temperatures, refluxing, or long reaction periods. In general, the objects of this invention are accomplished by treating the crude amine mixture with an excess of phthalic anhydride at ordinary or slightly elevated temperatures with adequate agitation and thereafter, when the reaction is complete, adding aqueous alkali to the reactive materials, separating the oily and aqueous fractions of the resulting body. The oily layer of the di-alkyl-aromatic-amines may be isolated and from the aqueous layer the mono-alkyl-aromatic amines may be separated. In the case of the mono-alkyl-compound the separation is by hydrolysis according to the following equation:

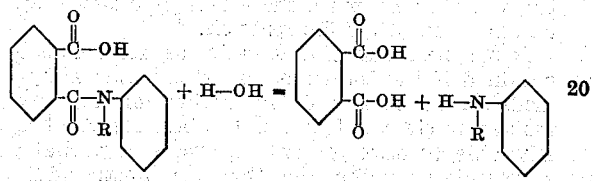

The invention will be readily understood from a consideration of the following examples in which the parts are given by weight.

Example I

Two hundred (200) parts of oil containing 40% mono-ethyl-aniline and 60% di-ethyl-aniline was treated in a vessel with 113 parts of phthalic anhydride with agitation for one hour. Then a solution of 36.4 parts sodium hydroxide in 730 parts of water was added and the agitation continued one-half hour. The mixture was filtered to break up any emulsion and the upper layer, essentially pure di-ethyl-aniline (99.6% pure), was separated. The aqueous layer or portion was hydrolyzed by adding 130 parts of 96% sulphuric acid and boiling three-quarters of an hour. The solution was cooled and the phthalic acid which separated filtered off. From the filtrate mono-ethyl-aniline was separated after an excess of alkali was added. The di-ethyl-aniline recovered equalled 98%. The mono-ethyl-aniline recovered equaled 95%. In the condensation step the temperature should not be allowed to rise above 65° C.

Example II

Eight hundred (800) parts of an oil containing 6.31% mono-ethyl-aniline was treated in a vessel with 72.5 parts of phthalic anhydride with agitation for one hour. Then a solution of 23.6 parts of caustic soda in 475 parts of water was added and the agitation continued one-half hour. The mixture was filtered to break up any emulsion and the upper layer, essentially pure methyl-ethyl-aniline (99.5% pure), separated. The aqueous layer was hydrolyzed by adding 74.5 parts of 96% sulphuric acid and boiling three-quarters of an hour. The solution was cooled and the phthalic acid which separated filtered off. From the filtrate mono-ethyl-aniline was separated after an excess of alkali was added. The methyl-ethyl-aniline recovered equalled 98.5%. The mono-ethyl-aniline recovered equalled 95%.

The process is not limited to the specific amines or mixtures thereof given in the above examples but is of general scope. It is especially adaptable to the purification of methyl anilines, ethyl anilines, butyl anilines, and the like, methyl-ethyl anilines and alkylated ortho-, meta- and para-toluidines.

It has been found that when mixtures of mono-ethyl aniline and di-ethyl aniline are reacted with phthalic anhydride that the reaction mass assumes the properties of a resin if the percentage of mono-ethyl aniline exceeds 60%. Accordingly, from a practical standpoint it is not advisable to attempt to separate mixtures containing greater proportions of this secondary amine by the same procedures used for mixtures containing less mono-ethyl aniline.

Ordinarily when the mixture is agitated with phthalic anhydride the temperature rises slightly from the heat of the reaction.

Because of their consistency it is advisable to keep di-ethyl aniline and mono-ethyl aniline mixtures containing more than 40% of mono-ethyl aniline warm after the reaction.

It has been found that better separations are obtained if the total amount of phthalic anhydride to be used and the amine mixture are reacted fairly rapidly. For the best results it is advisable to have present an excess of phthalic anhydride until the time that the caustic addition is made. In basifying an excess of alkali should be present from the start in order to obtain the best results.

Ordinarily after condensation with phthalic anhydride a dilute solution of sodium hydroxide is added to the reaction mass until the resultant solution is alkaline to brilliant paper yellow (C. I. 364) test paper.

Small amounts of primary aromatic amines or other impurities may be present without detriment to the process but when the amount of primary aromatic amine exceeds 5% (preferably not more than 3% is allowed) the quality of the recovered di-alkyl aromatic amine is likely to be affected.

This invention has the advantage that it eliminates the necessity for preliminary or other distillation and does not require that the recovered amines be distilled unless they are required to be anhydrous.

It eliminates the use of a neutral solvent and its attendant recovery and fire hazards.

The various alkaline solutions may be used for the formation of the phthalaminic acid salts.

As many apparently widely different embodiments of this invention may be made without departing from the spirit and scope thereof it is to be understood that we do not limit ourselves to the specific embodiments thereof except as defined in the appended claims.

We claim:

1. A process for separating di-ethyl-aniline and mono-ethyl-aniline from a mixture of the two comprising adding phthalic anhydride to the mixture while maintaining room temperatures to form a phthalaminic acid, said conversion being carried out in the absence of substantial proportions of materials other than the alkylated aromatic amines to be separated and the phthalic anhydride and adding aqueous alkali to dissolve the said acid.

2. A process for separating di-alkyl-anilines and mono-alkyl-anilines from a mixture of the two comprising adding phthalic anhydride to the mixture while maintaining room temperatures to form a phthalaminic acid, said conversion being carried out in the absence of substantial proportions of materials other than the alkylated aromatic amines to be separated and the phthalic anhydride and adding aqueous alkali to dissolve the said acid.

3. The separation of di-ethyl-aniline from mixtures of the same with not more than 60% mono-ethyl-aniline which comprises treating a mixture thereof with phthalic anhydride in the absence of inert solvents and at room or slightly elevated temperatures, and treatment of the resultant with aqueous alkali.

4. The separation of mono- and di-alkyl-amines of the benzene series which comprises treating a mixture thereof with phthalic anhydride in the absence of inert solvents and at room temperatures, and treatment of the resultant with aqueous alkali.

5. The separation of di-alkyl-amines of the benzene series from their mixtures with mono-alkyl-amines of the benzene series which comprises treating the mixture thereof with phthalic anhydride in the absence of inert solvents and at room or slightly elevated temperatures, and treatment of the resultant with aqueous alkali.

6. The process which comprises treating a mixture, consisting substantially of mono-ethyl-aniline and di-ethyl-aniline in which the amount of mono-ethyl-aniline does not exceed 60% of the mixture, with phthalic anhydride in an amount in excess of that molecularly required to combine with the mono-ethyl-aniline to form a phthalaminic acid, said reaction being carried out at room temperatures, thereafter treating the reaction mass with an aqueous solution of an alkali metal hydroxide and separating the oily di-ethyl-aniline from the solution containing the mono-ethyl-aniline-phthalaminic body.

7. The separation of N-di-alkyl-amines of the benzene series from their mixtures with N-mono-alkyl-amines of the benzene series which comprises treating the mixture thereof with phthalic anhydride in the absence of inert solvents and at room or slightly elevated temperatures, and treatment of the resultant with aqueous alkali.

8. The process which comprises treating a mixture consisting of mono-ethyl-aniline and di-ethyl-aniline containing mono-ethyl-aniline in which the amount of mono-ethyl-aniline is within the range 6.31% to 60% of the mixture at room temperature, with phthalic anhydride in an amount in excess of that molecularly required to combine with the mono-ethyl-aniline to form a phthalaminic acid, maintaining the temperature below 65° C. during the course of the reaction, thereafter treating the reaction mass with an aqueous solution of an alkali metal hydroxide and separating the oily di-ethyl-aniline from the solution containing the mono-ethyl-aniline-phthalaminic body.

9. The process which comprises treating a mixture consisting essentially of mono-ethyl-aniline and diethyl-aniline containing 6.31 to 60% mono-ethyl-aniline at room temperature, with phthalic anhydride in an amount in excess of that molecularly required to combine with the mono-ethyl-aniline to form a phthalaminic acid, thereafter treating the reaction mass with an aqueous solution of an alkali metal hydroxide and separating the oily di-ethyl-aniline from the solution containing the mono-ethyl-aniline-phthalaminic body.

JOHN BELMONT COOK, Jr.
DONALD HUTTON.